United States Patent [19]

Liubakka et al.

[11] Patent Number: 5,483,448
[45] Date of Patent: Jan. 9, 1996

[54] ADAPTIVE VEHICLE SUSPENSION SYSTEM WITH MECHANISM FOR VARYING CONTROLLER GAINS IN RESPONSE TO CHANGING ROAD ROUGHNESS CONDITIONS

[75] Inventors: Michael K. Liubakka, Livonia; James R. Winkelman, Bloomfield, both of Mich.

[73] Assignee: Ford Motor Company, Dearborn, Mich.

[21] Appl. No.: 26,369

[22] Filed: Mar. 4, 1993

Related U.S. Application Data

[63] Continuation-in-part of Ser. No. 990,389, Dec. 14, 1992.

[51] Int. Cl.$^6$ .............................. B60G 25/00; G05B 13/02
[52] U.S. Cl. .................... 364/424.05; 364/148; 364/151; 364/157; 364/165; 280/707; 280/6.1
[58] Field of Search ...................... 364/148, 149, 364/151, 152, 157, 178, 179, 164, 165, 166, 424.05; 280/707, 6.1, 840, DIG. 1; 395/20, 903

[56] References Cited

U.S. PATENT DOCUMENTS

| | | | |
|---|---|---|---|
| 4,349,868 | 9/1982 | Brown | 364/157 |
| 4,609,855 | 9/1986 | Andrews | 364/152 X |
| 4,648,622 | 3/1987 | Wada et al. | 280/707 |
| 4,765,648 | 8/1988 | Mander et al. | 280/707 |
| 4,771,848 | 9/1988 | Namba et al. | 180/197 |

(List continued on next page.)

FOREIGN PATENT DOCUMENTS

| | | |
|---|---|---|
| 0220115 | 4/1987 | European Pat. Off. . |
| 0314296 | 5/1989 | European Pat. Off. . |
| 3432757A1 | 3/1986 | Germany . |
| 3715423A1 | 11/1987 | Germany . |
| 62-289420 | 6/1986 | Japan . |
| 2164765 | 3/1986 | United Kingdom . |

OTHER PUBLICATIONS

J. T. Ball, "Approaches and Trends in Automatic Speed Controls," SAE Technical Paper No. 670195, 1967.
W. C. Follmer, "Electronic Speed Control," SAE Technical Paper No. 740022, 1974.
B. Chaudhuri et al., "Speed Control Integrated into the Powertrain Computer", SAE Technical Paper No. 860480, 1986.
T. Tabe et al., "Vehicle Speed Control System for Using Modern Control Theory," IEEE IECON '86 Proceedings, 1986.
M. Uriubara et al., "Development of Automotive Cruising Using Fuzzy Control System," Journal of SAE of Japan, vol. 42, No. 2, 1989.
T. Tsijii et al., "Application of Self–Tuning to Automotive Cruise Control," American Control Conference Proceeding, May, 1990.
M. Sunwoo et al. "Investigation of Adaptive Control Approaches For Vehicle Active Suspension Systems," American Control Conference, Jun. 26–28, 1991.

*Primary Examiner*—Collin W. Park
*Attorney, Agent, or Firm*—Raymond L. Coppiellie; Roger L. May

[57] ABSTRACT

An active suspension system uses a closed-loop feedback controller with tunable feedback gains to produce a control signal which minimizes a cost function formed by the weighted sum of system outputs including body acceleration and wheel displacement error. The feedback gains are adaptively varied by incremental amounts which are calculated based on the "pseudo-sensitivities" of those gains to system outputs, the pseudo-sensitivities being generated by a fixed-gain model of the suspension system and being combined using weighting factors which insure convergence in accordance with the predetermined cost function. The weighting factors are combined with the pseudo-sensitivities in a manner in which the trade-off between body acceleration, wheel displacement error and the control signal is altered with varying magnitudes of road inputs to continually minimize the cost function for varying road inputs. The adaptive control provides long-term compensation for varying road conditions, variations from vehicle-to-vehicle, and changes in vehicle performance.

3 Claims, 7 Drawing Sheets

U.S. PATENT DOCUMENTS

| | | | |
|---|---|---|---|
| 4,803,637 | 2/1989 | Tada et al. | 364/426.04 |
| 4,819,172 | 4/1989 | Takeuchi et al. | 364/431.07 |
| 4,840,245 | 6/1989 | Kamei et al. | 180/179 |
| 4,870,583 | 9/1989 | Takahashi et al. | 364/426.04 |
| 4,893,243 | 1/1990 | Tada et al. | 364/426.04 |
| 4,907,154 | 3/1990 | Yasuda et al. | 364/424.05 |
| 4,934,731 | 6/1990 | Hiwatashi et al. | 280/698 |
| 5,020,781 | 6/1991 | Huang | 267/136 |
| 5,037,128 | 8/1991 | Okuyama et al. | 280/703 |
| 5,097,419 | 3/1992 | Lizell | 364/424.05 |
| 5,235,512 | 8/1993 | Winkelman et al. | 364/426.04 |
| 5,282,130 | 1/1994 | Molnar | 364/157 |
| 5,311,421 | 5/1994 | Nomura et al. | 364/157 |
| 5,347,447 | 9/1994 | Kiji et al. | 364/152 |
| 5,353,207 | 10/1994 | Keeler et al. | 364/148 X |

ADAPTIVE VEHICLE SUSPENSION SYSTEM WITH MECHANISM FOR VARYING CONTROLLER GAINS IN RESPONSE TO CHANGING ROAD ROUGHNESS CONDITIONS

CROSS-REFERENCE TO A RELATED APPLICATION

This application is a continuation-in-part of U.S. patent application entitled "Adaptive Active Vehicle Suspension System", U.S. Ser. No. 07/990,389, filed Dec. 14, 1992.

FIELD OF THE INVENTION

This invention relates to vehicle suspension systems for movably mounting wheels on a vehicle body in optimum ways to enhance passenger comfort and improve the vehicle's handling characteristics.

BACKGROUND OF THE INVENTION

Adaptive suspension systems operate to alter the characteristics of a vehicle suspension system in response to varying road inputs such as vehicle body acceleration and wheel travel. In general, adaptive suspension systems utilize a pressurized fluid which is provided to suspension units, one at each vehicle wheel, to dissipate and/or counteract undesirable external forces. Typically such systems operate under the control of an electronic controller which senses the varying inputs and alters the suspension characteristics by directing fluid flow in an attempt to improve vehicle handling and ride comfort for the road surface over which the vehicle is traveling.

Active suspension systems improve vehicle ride by lowering the natural frequency of the vehicle body and increasing body damping. Several practical problems arise though in developing adequate responses to road inputs. First, the vehicle parameters are not easily determined and may change from vehicle to vehicle, over time, or with road conditions. Second, minimizing body acceleration must be traded off with wheel travel and controller power. Last, even if vehicle parameters remain constant, suspension calibrations which minimize vertical acceleration change with the shape of the road frequency spectrum. Consequently, it is desirable to have an adaptive controller which can automatically compensate and determine the optimal gains for an active suspension system and vary the necessary trade-off between body acceleration, wheel travel and controller power.

SUMMARY OF THE INVENTION

The present invention takes the form of an adaptive, active suspension system in which powered actuators are used to apply forces between a vehicle's body and wheels, the magnitude of the forces being computed in accordance with optimization routines which are themselves altered in response to changing driving conditions.

In accordance with the invention an adaptive controller is utilized to deliver a control signal to an active suspension system. The control signal has a value related to plural, time varying input signals each indicative of the value of a variable quantity characterizing the state of the suspension system. The input signals are combined to produce the control signal in a manner specified by plural control gain values. The adaptive controller produces time averaged signals corresponding to the input signals. The time averaged signals are used to produse sensitivity signals which have a value indicative of the predicted rate of change of the value of one of the input signals with respect to an incremental change in one of the control gain values. The control gain values are adaptively varied by an incremental amount related to the combination of those sensitivity values which indicate rates of change of outputs with respect to the corresponding control gain value and an error. The combination of sensitivity values being formed in accordance with a plurality of weighting factors indicating the relative importance assigned to each of the sensitivity values. The rate at which the control gains are varied is altered whereby the adaptation rate is decreased for high input signal values to insure stability of the active suspension system.

In accordance with the invention, computational methods are employed to alter control variables which determine the dynamic characteristics of the suspension system, the variables being modified in response to changing conditions to control the dynamic characteristics of the suspension system while maintaining a desired relationship between the amount of acceleration experienced by the vehicle body, the displacement from equilibrium which occurs between the wheel and the vehicle body, and the amount of power delivered to the active suspension actuator.

In the preferred embodiment of the invention to be disclosed, the control gains used to control the amount of acceleration and position error feedback are adaptively varied to compensate for changing road conditions, variations from vehicle to vehicle, and changes in the performance of the suspension system over time. The control gains are adaptively altered in increments, the values being calculated based on "pseudo-sensitivities" which are produced by a fixed gain model of the suspension system and which indicate the rate at which system outputs change with incremental changes in the value of the feedback gains to be modified and the error.

In accordance with a primary object of the invention, the incremental gain changes are calculated from a combination of pseudo-sensitivity values which are assigned weights selected to achieve a variable relationship between system output values and an error. The relationship varies with the magnitude of the acceleration experienced by the vehicle body, the displacement from equilibrium which occurs between the wheel and the vehicle body, and the amount of power delivered to the active suspension actuator.

In accordance with another feature of the invention, the rate at which the control gains are adaptively altered is varied whereby the adaptation rate is decreased for high input signal values to insure system stability.

These and other features and advantages of the present invention may be better understood by considering the following detailed description of a specific embodiment of the invention. In the course of this description, reference will frequently be made to the attached drawings.

DESCRIPTION OF THE PREFERRED EMBODIMENT

Figure 2:
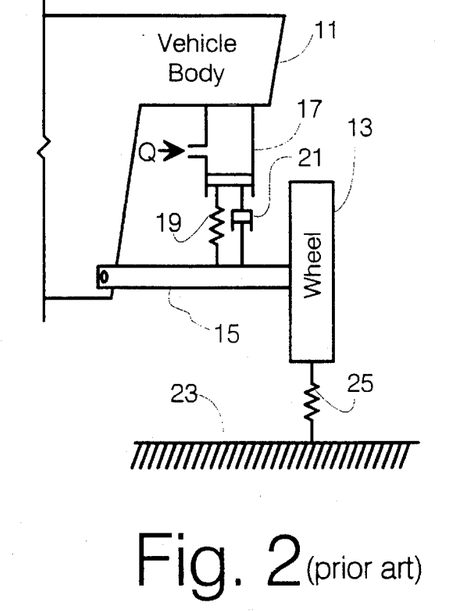
FIG. 2 is a pictorial diagram of a quarter-car model of an active suspension system of the type which may be controlled using the principles of the present invention.

The goal of active vehicle ride control is to improve passenger comfort and handling over a variety of road surfaces. For the simplest analysis, the vehicle can be viewed as a quarter car moving only in the vertical direction. This results in a vehicle model of the form shown in FIG. 2, in which the mass of the vehicle's body is represented by the sprung mass 11. The wheel, represented by the unsprung mass 13, is attached to the body 11 by a control arm 15. The body 11 is supported above the unsprung wheel mass 13 by an active suspension system composed of an actuator which consists of the control arm 15, a spring 19, a damper 21, and a volume of fluid 17 which acts in series with spring 19 and damper 21. By pumping a fluid flow Q in or out of the actuator 17, the suspension forces and ride heights can be controlled. The wheel's unsprung mass 13 is supported by the road surface 23, the tire deflection being represented in the model of FIG. 3 by the spring 25. The invention to be described may also be used with other active suspension actuators, such as a force generator in parallel with a spring and damper.

A passive suspension model includes only the spring and damper. The vertical frequency responses of the active and passive systems are compared in FIG. 4. The gain of the passive suspension system is shown by the solid line curve, while the gain of the active suspension system is depicted by the dashed line curve in FIG. 4. An active suspension improves ride by lowering the natural frequency of the body and increasing body damping. The difference between the two gain curves is a measure of improved ride performance. A lower gain means better ride since the body sees less acceleration.

There are several practical problems encountered in tuning an active suspension. First, the vehicle parameters are not easily determined and may change from vehicle to vehicle, over time, or with road conditions. Second, minimizing body acceleration must be traded off with wheel travel and controller power. Lastly, the optimum dynamic characteristics which are needed to minimize vertical acceleration change with the shape of the road frequency spectrum (even if vehicle parameters remain constant). U.S. patent application No. 07/990,389 noted above described an adaptive controller which automatically compensates for such variations and determines the optimal gains for the active suspension system. The present invention is a similar adaptive controller with the added advantage of using road amplitude to alter the tradeoff between body acceleration, wheel travel and controller power.

Figure 1:
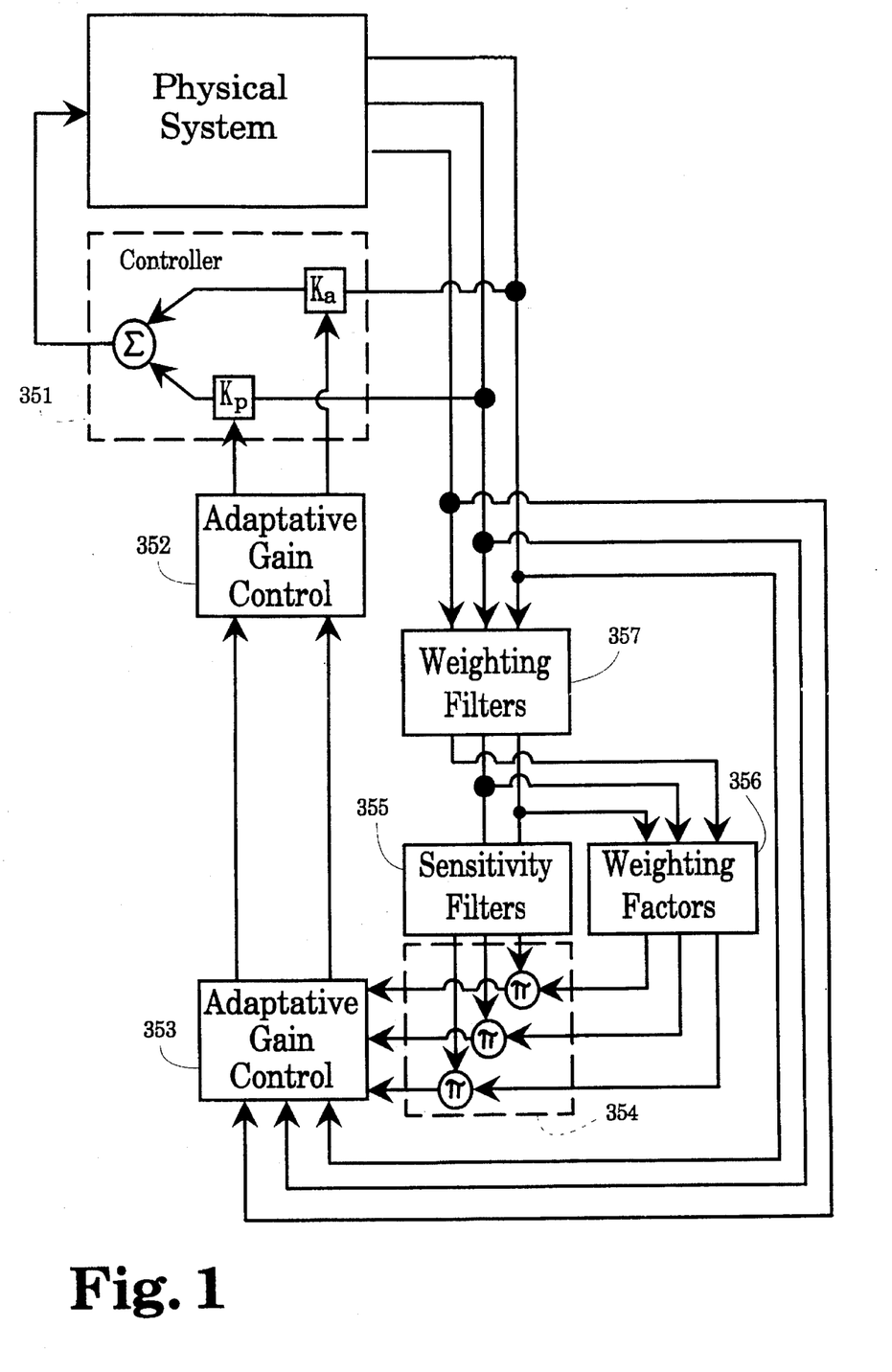
FIG. 1 shows a closed-loop control system which embodies the principles of the invention.

FIG. 1 shows a closed-loop control system which embodies the principles of the invention. A controller 351 delivers a control signal to a physical system 350 which generates a plurality of time varying signals, each of which is indicative of the value of a variable quantity characterizing the state of the physical system. These time varying signals are utilized as inputs by the control system to generate the control signals for the physical system 350 in a manner specified by plural control gain values. The controller 351 generates the control signal by summing control gains $K_a$ and $K_p$ which are generated by the operation of the modules at 352–357. Control gains $K_a$ and $K_p$ are altered, or tuned, in the manner described below to optimize the tradeoff between body acceleration, wheel travel and controller power. The input signals to the adaptive control algorithm are received by block 357 which generates a frequency weighted average value of the time varying input signals to the sensitivity filter block 355. The sensitivity filter module 355 produces sensitivity signals, each of which has a value indicative of the predicted rate of change of the value of one of the time averaged input signals with respect to the tunable controller gains. The time averaged outputs of module 357 are weighted with a plurality of weighting factors in block 356; each weighting factor indicating the relative amplitude assigned to each of the inputs. The sensitivity signals produced by module 355 are combined in module 354 with the weighting factors generated by module 356 to construct an estimate of the rates of change of the controller parameters with respect to time. This estimate advantageously modifies the weighting factors generated in module 356 in response to changes in the sensitivity signals generated in module 355. The outputs of module 354 are combined in module 353 to produce an approximate to the time rate of change of the controller gains. The incremental rate at which the control gains are varied is altered in module 353 in response to changes in the magnitude of the input signals. This functionality advantageously decreases the adaptation rate for high input signal values and increases the adaptation rate in response to low input signal values to insure stability of the system. The scaled rates of change of the controller parameters, which are the outputs of module 353 are accumulated in block 352 to produce the time varying controller gains, $K_a$ and $K_p$ which are then combined to form the control signal for the physical system 350.

The first step in implementing the adaptive control according to the present invention is the selection of a fixed gain control structure which provides the desired level of performance based on established vehicle parameters and nominal road inputs. For the physical model shown in FIG. 2, a preferred fixed-gain control structure is illustrated in FIG. 3 and includes both body acceleration feedback $\underline{a}$ and wheel displacement (strut length position error) feedback $\underline{e}$ to produce an output command value $\underline{u}$ which determines hydraulic fluid flow into (or out of) the actuator chamber.

Figure 3:
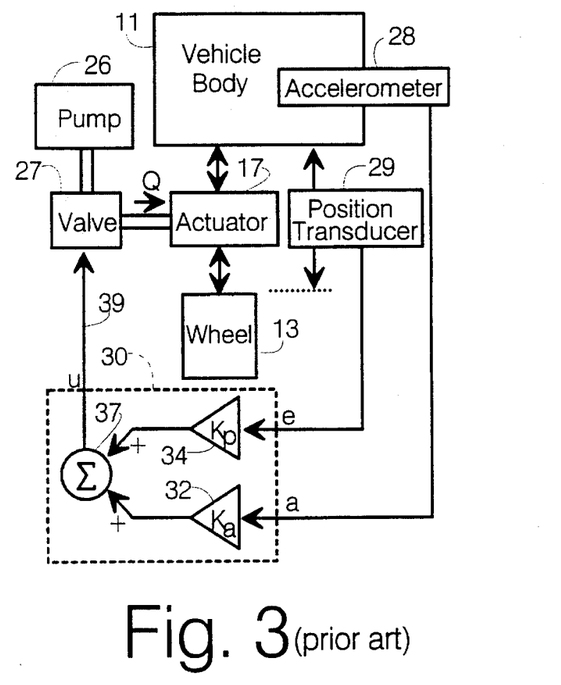
FIG. 3 is a schematic diagram of a known form of closed-loop suspension control system whose performance may be improved by utilizing the principles of the present invention.

As seen in FIG. 3, the fluid flow Q is supplied to the actuator 17 by the combination of a pump 26 and a control valve 27 which regulates the flow Q in accordance with a numerical command value $\underline{u}$. An accelerometer 28 provides the body acceleration signal $\underline{a}$ and a position transducer 29 provides the strut length position error signal $\underline{e}$. The acceleration value a is multiplied within a controller 30 by a first gain parameter $\underline{Ka}$ at 32 and the position error value $\underline{e}$ is multiplied by a second gain parameter $\underline{Kp}$ at 34. The outputs from the gain multipliers 32 and 34 are combined at a summing node 37 to form the flow command value $\underline{u}$ which is supplied to the control valve 27 via lead 39.

Since actuator force is a function of fluid volume (the integral of the fluid flow $\underline{Q}$), the actuator 17 acts as an integrator. Acceleration feedback acts like a sky-hook damper and strut error feedback provides integral control of ride height as described, for example, in the paper "Investigation of Adaptive Control Approaches for Vehicle Active Suspensions" by W. Sunwoo and K. C. Check, *American Control Conference*, pp. 1542–1548 (1991).

Figure 4:
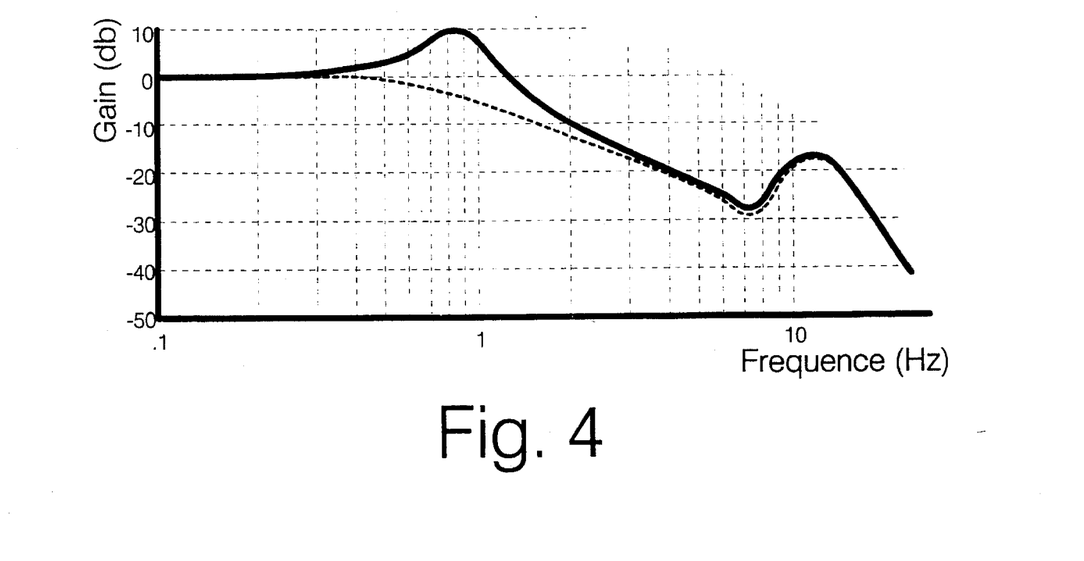
FIG. 4 is a graph which plots the gain of a conventional passive suspension system in comparison to the improved gain characteristics realizable with an active suspension system of the type contemplated by the invention.

Fixed values of the feedback gains $K_a$ and $K_p$ are then selected so that the control system shown in FIG. 3 provides adequate performance as illustrated in FIG. 4. These gains are typically selected during system development by "hand tuning" using both subjective and objective tests. Thereafter, the present invention provides a mechanism for adaptively tuning these gains to minimize a performance cost function using a pseudogradient adaptive approach with slow adaptation. U.S. Pat. No. 5,235,512 describes a similar adaptive control approach applied to adaptively vary the feedback gains in a vehicle speed controller.

The present invention provides a method for adaptively tuning a closed-loop suspension system of the type which generates control signal $\underline{u}$ in response to the two variable signals $\underline{a}$ and $\underline{e}$, the value of the control signal $\underline{u}$ being functionally related to the values of said two variable signals and the value of the two tunable gain parameters, $K_a$ and $K_p$. The method of adaptively tuning the gain parameters comprises the following steps:

First, suitable initial values for the two tunable gain parameters are selected to establish a predetermined desired relationship between the values of the two variable input signals $\underline{a}$ and $\underline{e}$, as specified by the a cost function, to be discussed.

Thereafter, the rates at which the values of said two variable signals change in response to a small deviation in each tunable parameter from its selected initial value are determined. These rates of change are here termed "pseudo-sensitivities" since they are modeled approximations of the actual sensitivities.

The pseudo-sensitivities are then combined in accordance with weighting coefficients and output errors to determine the value of the incremental change in the value of the tunable parameter with respect to time which is required to maintain said predetermined desired relationship as defined by the cost function as system operation conditions vary. The tunable parameters in the control system are then modified by the amount of the incremental change.

The weighting coefficients are altered in such a manner as to optimize the cost function as the amplitude of the variable signals and the control signal change.

The foregoing steps are continuously repeated throughout the continuing operation of said closed-loop control system to maintain the desired operating characteristics of the system as expressed by the cost function.

The present invention employs "sensitivity filters" for determining the rate of change at which system outputs vary with respect to changes in the values of control gains. One approach to implementing such sensitivity filters is the variable components method described in *Introduction to System Sensitivity Theory* by P. M. Frank, Academic Press: N.Y. (1978). Importantly, the sensitivity values produced by the sensitivity filters need not be exact. Since exact sensitivity values depend on both the values of the optimum feedback gains and correctly determined vehicle parameters, if both of these were known there would be little need for adaptive control. As described by D. S. Rhode in *Sensitivity Methods and Slow Adaption*, Ph.D. Thesis, University of Illinois at Urbana-Champaign (1990), adaptive control methods using inexact "pseudosensitivities" perform with stability provided that the "pseudogradient" control algorithm adheres to minimum requirements for convergence.

The suspension control system according to the present invention adaptively varies the feedback gain values from their predetermined initial values by altering these gain values by incremental amounts related to the pseudosensitivity values. These values are combined with an error vector and are weighted in accordance with a performance cost function which specifies the desired dynamic characteristics of the suspension system. The cost function resolves the trade-offs which must be made between minimizing body acceleration $\underline{a}$, the strut length error $\underline{e}$, and the magnitude of the control input $\underline{u}$. Other suspension system architectures may employ additional or different terms, but the cost function below may be taken as illustrative:

$$J(P) = \int_0^\infty \beta_a a^2 + \beta_e e^2 + \beta_u u^2 dt \tag{1}$$

where $\underline{a}$=body (sprung mass) vertical acceleration;

$\underline{e}$=strut length error (position error);

$\underline{u}$=commanded actuator flow;

$\beta_x$=weighting factors to determine the relative importance of $\underline{a},\underline{e}$ and $\underline{u}$; and $$P = \begin{bmatrix} K_a \\ K_p \end{bmatrix} \tag{2}$$

The control feedback gains $K_a$ and $K_p$ are adaptively varied by incremental amounts calculated to minimize the cost function $J(P)$, thus adapting the control system to achieve desired dynamic characteristics under changing road conditions, performance variations from vehicle to vehicle, and changes in the performance of vehicle's suspension system over time.

In the above cost function, the relative values of the weighting factors $\beta_x$ are selected by the designer to best achieve the ride characteristics desired. Selecting a relatively larger value of $\beta_a$ reduces the amount of body acceleration at the cost of increased "rattlespace" and a larger actuator power for better ride. Increasing $\beta_e$ reduces wheel bounce for better handling at the price of a stiffer ride and increased actuator power.

A current method of selecting the relative values of the weighting factors is to choose a "worst case" road disturbance and tune the controller to use the full available rattlespace (wheel travel relative to the body) for that worst case road. Such an approach is described by D. Hrovat and M. Hubbard, *Optimum Vehicle Suspensions Minimizing RMS Rattlespace, Sprung—Mass Acceleration, and Jerk*, ASME Paper No. 81WA/DSC-23, November 1981.

Such an approach provides an optimum vehicle suspension for the chosen worst case road. However, such an approach provides decreasing levels of performance as the actual road disturbances diverge from the chosen worst case scenario for which the controller was tuned. In particular, a softer suspension using as much rattlespace as necessary is desired for smooth roads and a stiffer suspension which stops the wheels from hitting the bump stops is desired for extremely rough roads.

The present invention overcomes the deficiencies inherent in tuning a suspension according to a predetermined worst case road by utilizing the principles of the adaptive controller shown in FIG. 1. In particular, the present invention uses a modified cost function and a modified gradient algorithm with slow adaptation. In this manner, one algorithm provides optimal control gains as vehicle parameters and the frequency content of the road change plus optimal control gains as the amplitude of road disturbances change. The algorithm advantageously changes the gains at a relatively slow rate to optimize the suspension for the current averaged road inputs.

The relative magnitude of $\beta_a$, $\beta_e$, and $\beta_u$ in equation (1) determine the desired trade-off between body acceleration ($\underline{a}$), rattlespace use ($\underline{e}$), and control power used ($\underline{u}$). A vehicle suspension behaves essentially as a linear system up until the point where the suspension hits the bump stops. Thus as the size of road disturbances increase, $\underline{a}$, $\underline{e}$, and $\underline{u}$ increase proportionally. This means that the trade-off between the three terms in equation (1) does not change with road amplitude. Therefore in designing such a controller, a performance level for a specific input must be chosen, i.e. full rattle space use for a worst case road.

The present invention makes the trade-off amplitude dependent by including higher order terms in the cost function. In a preferred embodiment, the cost function is as follows:

$$J(P) = \int_0^\infty \beta_a a^2 + \beta_{a2} a^4 + \beta_e e^2 + \beta_{e2} e^4 + \beta_u u^2 + \beta_{u2} u^4 \, dt \quad (3)$$

$$P = \begin{bmatrix} K_a \\ K_p \end{bmatrix} \quad (4)$$

After the weighting factors are chosen, fixed control feedback gains $K_a$ and $K_p$ may be selected which minimize the cost function J(P) for nominal operating conditions. However, these fixed gains do not take into account variations from vehicle to vehicle, changing vehicle dynamics over time, or changing road surface conditions. As contemplated by the invention, the feedback gains $K_a$ and $K_p$ are adaptively varied at a relatively slow rate to compensate for changing vehicle and driving conditions to better achieve the desired performance characteristics represented by minimizing the cost function.

This adaptation is preferably achieved by executing an adaptive algorithm implemented by a microcontroller operating under stored program control. The adaptive method used is generally depicted in the flowchart of FIG. 5 which illustrates the implementation as a parameter update routine, seen enclosed within the dotted-line 44 in FIG. 5, which is executed as part of the normal closed-loop control subroutine for generating the output flow control commands.

Figure 5:
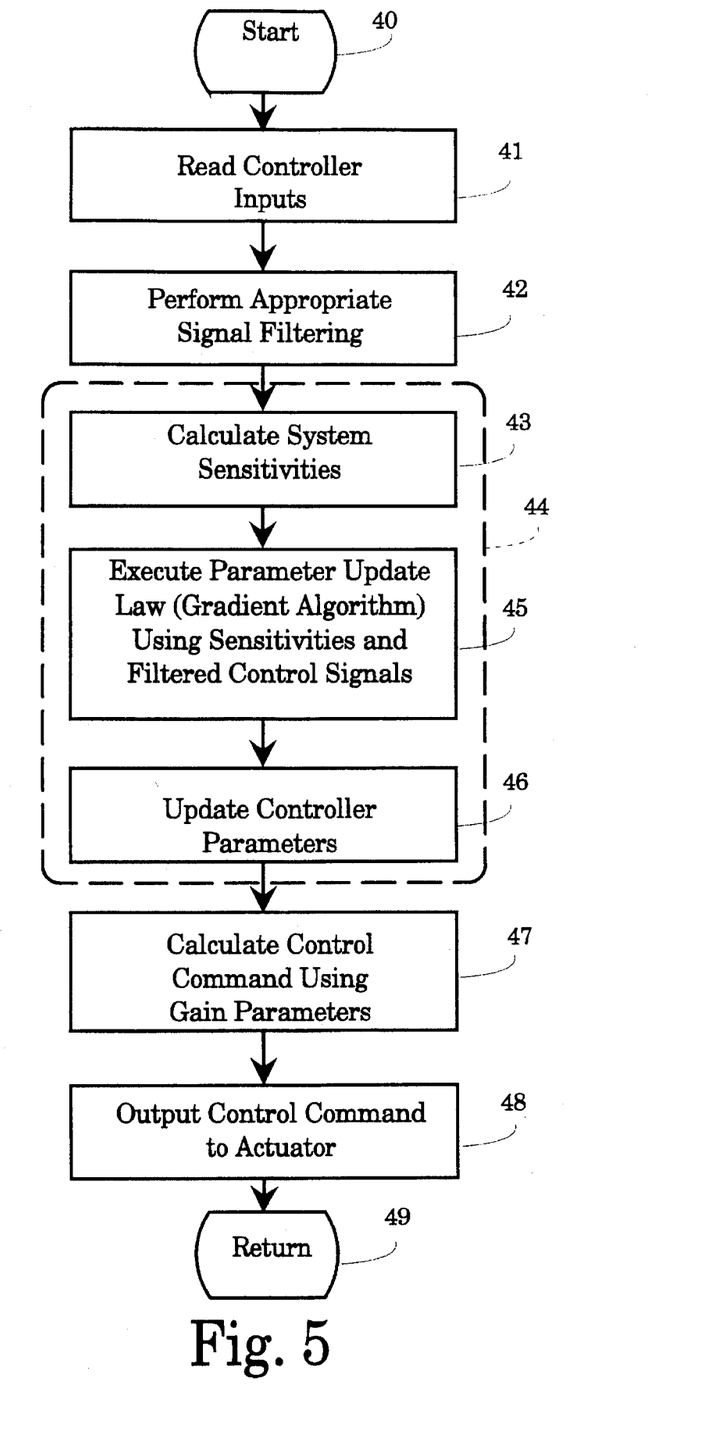
FIG. 5 is a flowchart which depicts the overall computational routine contemplated by the invention for controlling the active suspension system actuators.

The overall control subroutine is entered at 40 as seen in FIG. 5 and begins by reading the accelerometer and position sensor to provide controller inputs at 41. The sensor signals read at step 41 are filtered at step 42 to remove unwanted frequency components and the results are processed by the adaptive routine 44 and the remainder of the control routine. As illustrated by FIG. 3, the input values which are available for use in the adaptive routine 44 include:

(1) the value $\underline{a}$ which is obtained from accelerometer 28 which senses the amount of vertical acceleration being experienced by the vehicle mass (seen at 11 in FIG. 2); and (2) the value $\underline{e}$ from the position transducer 29 which indicates the strut position error as the wheel mass 13 is deflected from its equilibrium position.

The control routine shown in FIG. 5 produces a third quantity which is calculated at step 47, supplied to the actuator 17 at step 48, and taken into account by the adaptive gain control mechanism in the adaptive routine 44. This third quantity is:

(3) the value $\underline{u}$, the actuator fluid flow command quantity, which determines (after integration by the actuator 17) the amount of force applied by the actuator between the vehicle body and the unsprung wheel mass. The value $\underline{u}$ is necessarily limited, in any practical system, by the amount of power which can delivered to the suspension system by the available pump and actuator mechanisms.

The adaptive routine 44 may be performed at a slower rate that the remainder of the control routine shown in FIG. 5. The actuator control value $\underline{u}$ must be updated at a rate high enough to control the sprung mass acceleration frequency components (up to about 10 hertz, above which the system response is dominated by the characteristics of the passive spring and damper as seen from FIG. 4). However, the feedback gains should only adapt at a significantly slower rate. The rate of gain adaptation is controlled by a predetermined constant $\epsilon$ which, as discussed in more detail below, operates a sizing coefficient to limit the magnitude of each incremental adjustment to the system's control gains. The computational burden placed on the control microprocessor may be lowered by reducing the frequency at which the adaptive algorithm 44 is performed while correspondingly increasing $\epsilon$ to yield the same total adaptive gain change.

The incremental amount by which each control variable is adaptively varied by the updating routine 44 is given by the following expressions which define the gradient algorithm used to minimize the cost function in equation (1):

$$\frac{dK_a}{dt} = \epsilon \left( \beta_{a,a} a \frac{\delta a}{\delta K_a} + \beta_{e,a} e \frac{\delta e}{\delta K_a} + \beta_{u,a} u \frac{\delta u}{\delta K_a} \right) \quad (5)$$

$$\frac{dK_p}{dt} = \epsilon \left( \beta_{a,p} a \frac{\delta a}{\delta K_p} + \beta_{e,p} e \frac{\delta e}{\delta K_p} + \beta_{u,p} u \frac{\delta u}{\delta K_p} \right) \quad (6)$$

In the gradient algorithm definitions above, the coefficient $\epsilon$ is kept small to insure "slow" adaptation as noted above. The partial derivatives of system outputs $\underline{a}, \underline{e}$ and $\underline{u}$ with respect to the system parameters (feedback gains $K_a$ and $K_p$) are the system "sensitivities" which are calculated in real time by using sensitivity filters which will be described in more detail later.

In accordance with the principles of the present invention, the following gradient algorithm is used to reflect the use of higher order terms in the cost function expressed in equation (3).

$$\frac{dK_a}{dt} = \epsilon \left( \beta_{a,a} a \frac{\delta a}{\delta K_a} + \beta_{a2,a} a^3 \frac{\delta a}{\delta K_a} + \beta_{e,a} e \frac{\delta e}{\delta K_a} + \right. \quad (7)$$
$$\left. \beta_{e2,a} e^3 \frac{\delta e}{\delta K_a} + \beta_{u,a} u \frac{\delta u}{\delta K_a} + \beta_{u2,a} u^3 \frac{\delta u}{\delta K_a} \right)$$

$$\frac{dK_p}{dt} = \epsilon \left( \beta_{a,p} a \frac{\delta a}{\delta K_p} + \beta_{a2,p} a^3 \frac{\delta a}{\delta K_p} + \beta_{e,p} e \frac{\delta e}{\delta K_p} + \right. \quad (8)$$
$$\left. \beta_{e2,p} e^3 \frac{\delta e}{\delta K_p} + \beta_{u,p} u \frac{\delta u}{\delta K_p} + \beta_{u2,p} u^3 \frac{\delta u}{\delta K_p} \right)$$

In accordance with the principles of the adaptive controller shown in FIG. 1, this gradient algorithm along with the cost function in equation (2) allows the controller to explicitly account for road roughness. The additional weighting factors in the higher order terms for the variable signals $\underline{a}$ and $\underline{e}$, and the control signal $\underline{u}$, explicitly accounts for varying road roughness. This novel feature advantageously alters the relative weighting of the magnitudes of the $\underline{a}$, $\underline{e}$, and $\underline{u}$ terms of the control parameter gradient with varying magnitudes of road roughness For example, if $\beta_{a/\beta e} > 1 > \beta_a a^2/\beta_e^2$, the adaptive controller will weight body acceleration higher than rattlespace constraints for small amplitude signals and vice-versa for large amplitude signals.

As explained in the description accompanying FIG. 1, the adaptation gain, here termed $\epsilon$, must be kept small to insure the controller adapts at a relatively slow rate, which is necessary to maintain stability of the adaptive system. With the higher order terms in the cost function, choosing a sufficiently small $\epsilon$ leads to very poor convergence of the controller gains under most operating conditions. $\epsilon$ must be chosen to account for the worst case of large amplitude inputs where the $a^4$, $e^4$, and $u^4$ terms dominate the cost function. Then for nominal inputs where the $a^2$, $e^2$, and $u^2$ terms dominate, $\epsilon$ is too small and the adaptive algorithm does not converge in a reasonable amount of time. The present invention advantageously solves this problem by making $\epsilon$ a function of $\underline{a}$, $\underline{e}$, and $\underline{u}$. Consequently the gradient algorithms in equations (5) and (6) utilize a normalized value of $\epsilon$, herein designated as $\epsilon_n$, where $\epsilon_n$ is generated according to the following relationship:

$$\epsilon_n = \epsilon_{des} S(a,e,u) = \epsilon_{des}\left(\frac{1}{\frac{a^2}{3a_{max}^2} + \frac{e^2}{3e_{max}^2} + \frac{u^2}{3u_{max}^2} + 1e-10}\right) \quad (9)$$

where $\epsilon_n$ is the normalized $\epsilon$, and $\epsilon_{des}$ is the design $\epsilon$ for the design (or worst case) $\underline{a}$, $\underline{e}$, and $\underline{u}$ and $a_{max}$, $e_{max}$ and $u_{max}$ are the design values for $\underline{a}$, $\underline{e}$, and $\underline{u}$ respectively.

The normalizing term, S allows $\epsilon_n$ to vary with the size of $\underline{a}$, $\underline{e}$, and $\underline{u}$, maintaining an approximately constant rate of convergence for the control gains $K_a$ and $K_p$. $\underline{S}$ is limited to values between 0 and 1. Thus $\epsilon_n$ converges to zero as road inputs become large, and $\epsilon_{n=\epsilon des}$ for road inputs less than or equal to the design inputs. $\epsilon_n$ has a maximum limitation of $\epsilon_{des}$ because, while there is a benefit from letting $\epsilon_n$ become small for large inputs, it is undesirable to let $\epsilon_n$ increase continually as $\underline{a}$, $\underline{e}$, and $\underline{u}$ become successively smaller because when $\underline{a}$, $\underline{e}$, and $\underline{u}$ are small the system is performing well, and tuning the gains with a large value for $\epsilon$ can cause drift which is undesirable.

After normalization, $\epsilon_n$ is filtered with a low pass filter having a cutoff frequency below the natural frequencies of the dominant modes of the vehicle suspension system. This reduces the magnitude of the natural frequencies to negligible levels and consequently enhances gain convergence by reducing the interaction between the adaptation gain $\epsilon_n$ and the direction of the gain tuning.

Figure 6:
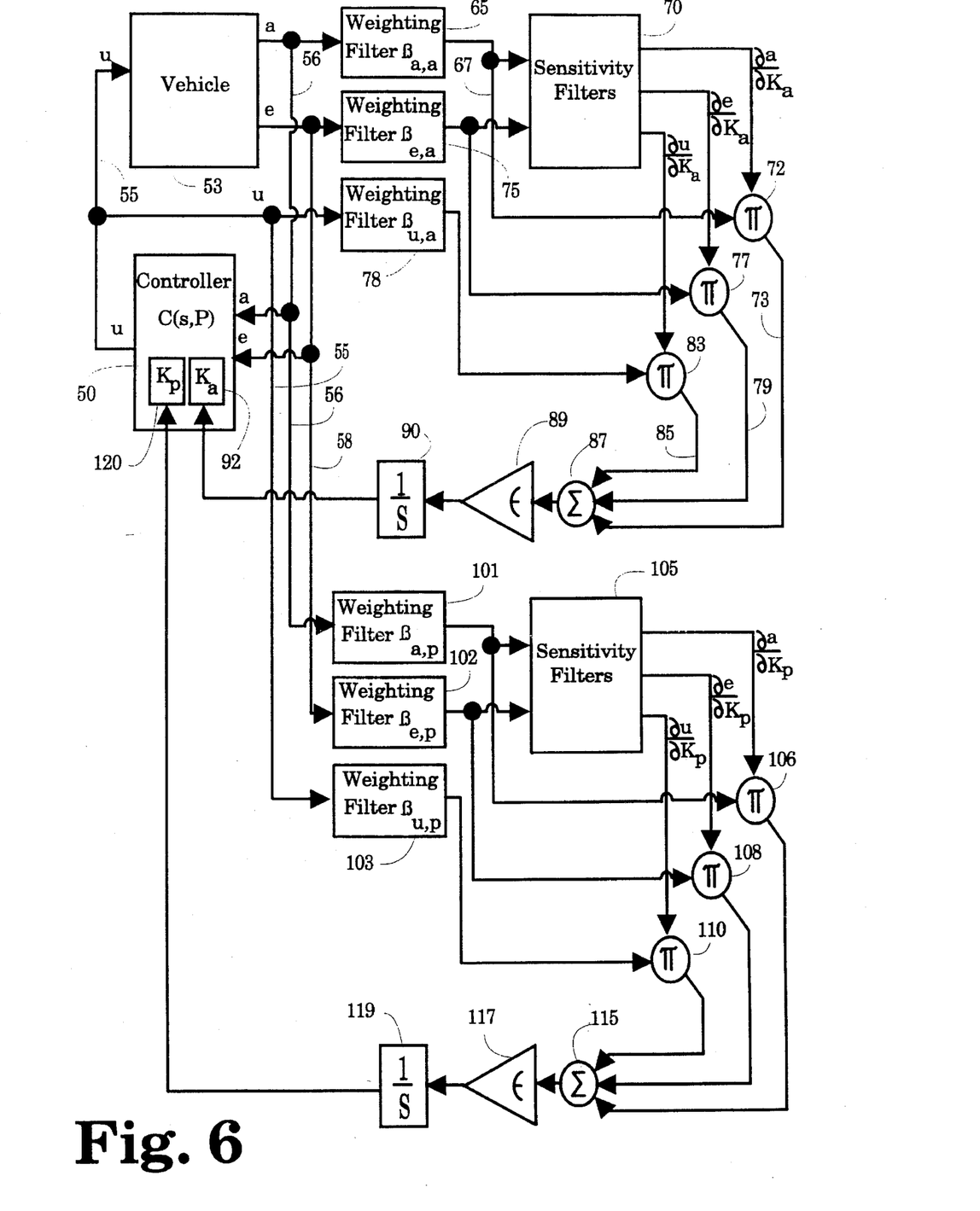
FIG. 6 is a block signal flow diagram of an adaptive suspension system utilizing the principles of the invention.

FIG. 6 of the drawings is a signal flow diagram which depicts the implementation of the cost function expressed in equation (1). As seen in FIG. 6, an adaptive closed-loop controller 50, which is typically implemented by a programmed microcontroller to perform the functions illustrated in FIG. 4, is connected to control a physical suspension system indicated by the block 53 by applying control command values $\underline{u}$ via lead 55 to a suspension system actuator (not shown) in response to sensed variations in the sprung mass acceleration value a obtained from the physical system 53 and supplied via a lead 56, and in response to the stroke position error $\underline{e}$ quantity which is also obtained from the physical system 53 and supplied on lead 58. The acceleration value $\underline{a}$ is multiplied by the weighting factor $\beta_{a,a}$ in a weighting filter 65 and the resulting product signal is applied via line 67 to a sensitivity filter at 70 and to a multiplier 72, the second input of which is connected to receive the partial derivatives $\delta a/\delta K_a$ from one of the sensitivity filters 70. The output lead 73 from multiplier 72 accordingly receives the quantity $a\beta_{a,a}(\delta a/\delta K_a)$. In like fashion, a weighting filter 75 and a summing node 77 are connected to form the quantity $e\beta_{e,a}(\delta e/\delta K_a)$ on lead 79. A weighting filter 78 and a summing node 83 are similarly connected to form the quantity $u\beta_{u,a}(\delta u/\delta K_a)$ on lead 85. The quantities on leads 73, 79 and 85 are added together at node 87 and the summation is multiplied times the adaptation rate coefficient $\epsilon$ at 89 to form the quantity $dK_a/dt$ as represented by equation (3) above. The gain coefficient $K_a$ used within the controller 50 may accordingly be stored in a register 92 whose contents are incremented or decremented by an amount equal to the calculated rate $dK_a/dt$ which adaptively varies the gain by an incremental amount which will minimize the cost relationship given by equation (1). The adaptive accumulation of these incremental changes is represented by the integration unit seen at 90 in FIG. 6.

An equivalent arrangement is employed to form the quantity $dK_p/dt$ as seen in the lower portion of FIG. 6. This arrangement comprises the weighting filters 101, 102 and 103, together with the sensitivity filters 105 and the multipliers 106, 108 and 110, to form the addends which are combined at node 115 and multiplied by $\epsilon$ at 117. The resulting quantity $dK_p/dt$ at the output of multiplier 117 is used to increment or decrement the gain $K_p$, as represented by the integration unit 119, to form the adaptive gain value stored in the register 120 for use by the controller 50.

Figure 9:
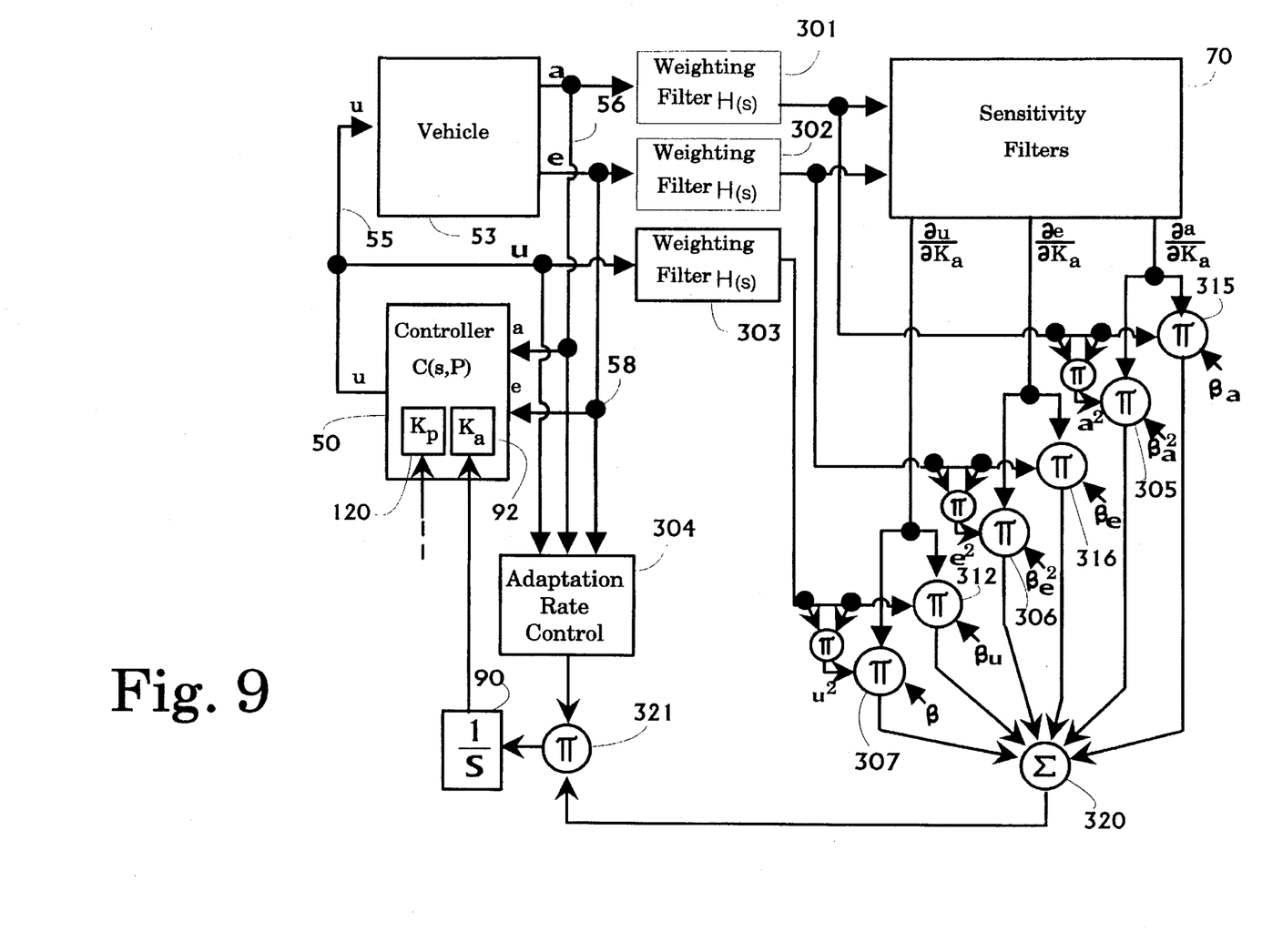
FIG. 9 is a block signal flow diagram of the adaptive suspension system with optimization for ride roughness contemplated by the invention.

FIG. 9 is a signal flow diagram, depicting the implementation of the cost function in equation (3). FIG. 9 shows the signal flow diagram for the generation of $K_a$. The signal flow diagram for the generation of $K_p$ will be similar to that for $K_a$ as already seen from FIG. 6 and its accompanying description.

Weighting filters 301, 302 and 303 generate weighted quantities for averaged values of $\underline{a}$, $\underline{e}$, and $\underline{u}$ respectively. The weighted values of $\underline{a}$ and $\underline{e}$ are utilized by the sensitivity filters 70 to generate the sensitivity values $\delta a/\delta K_a$ for summing nodes 305 and 315, $\delta e/\delta K_a$ for summing nodes 306 and 316, and $\delta u/\delta K_a$ for summing nodes 307 and 312.

The outputs of the weighting filters 301, 302, 303, their squares, and the sensitivity filters 70 are combined with the corresponding weighting factors at the nodes 305, 315, 306, 316, 307, and 312 to form the six terms in the right hand side of the gradient algorithm in equation (6). These terms are then summed at the summing node 320. $\epsilon_n$ is generated in the adaptation rate control block at 304 according to the relationship expressed in equation (9). This block performs a function similar to that performed at 353 in FIG. 1 by decreasing the adaptation rate for high input signal values to insure stability of the system. The output of the adaptation rate control block 304, $\epsilon_n$, is multiplied together with the output of the summing node 320 at 321 to form the right hand side of the gradient algorithm expressed in equation (6). This quantity is then integrated at 90 and the resulting value is stored in the register 92 ($K_a$) for use by the controller 50.

Figure 7:
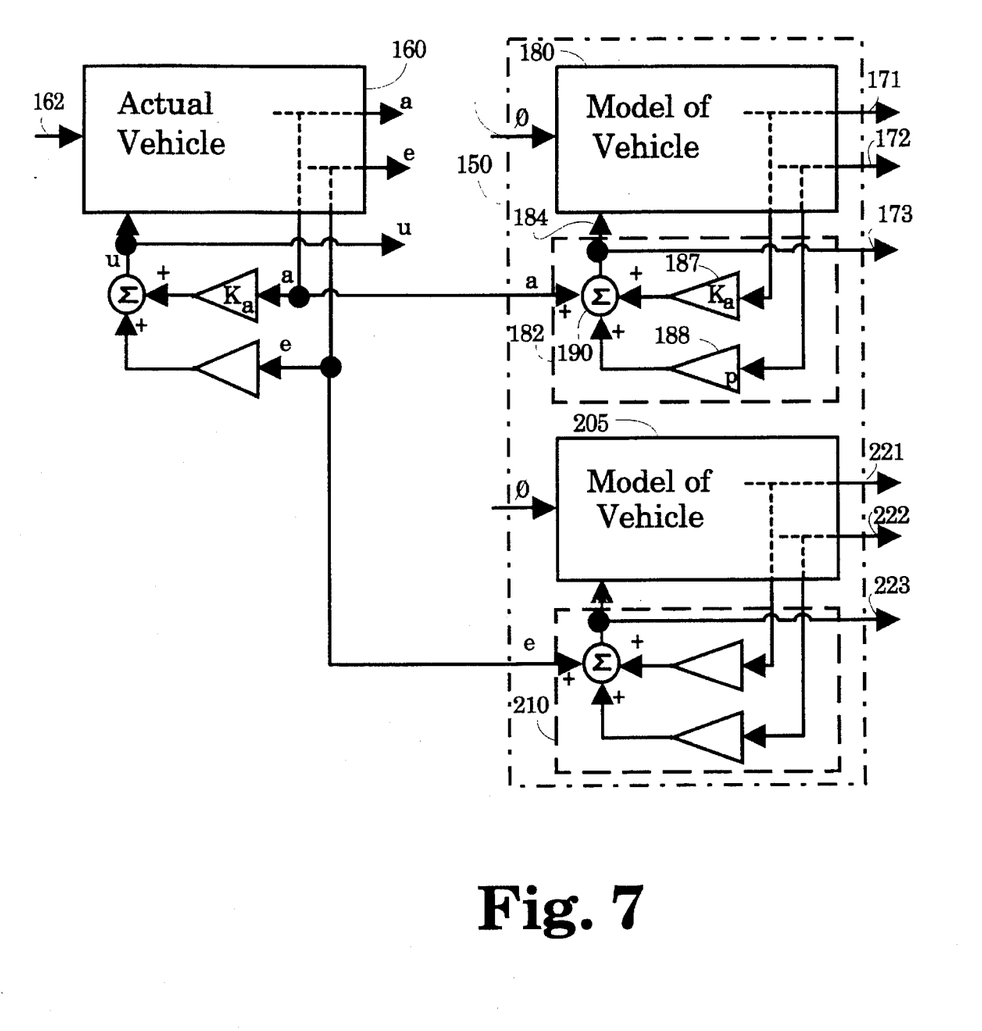
FIG. 7 is a block signal flow diagram which depicts the details of sensitivity filters which may be used to implement the invention.

The sensitivity filters 70 and 105 seen in FIG. 6 may be implemented using the variable components method as shown within the dashed-line rectangle 150 in FIG. 7. The sensitivity filters 150 are connected to receive and respond to the acceleration value $\underline{a}$ and the position error $\underline{e}$ from the physical suspension system of the actual vehicle represented at 160 in FIG. 7.

The quantities $\delta a/\delta K_a$, $\delta e/\delta K_a$ and $\delta u/\delta K_a$ are generated on leads 171, 172 and 173 respectively by the combination of a vehicle model 180 and a fixed gain controller 182. While the actual vehicle indicated at 160 in FIG. 7 responds to an actual road disturbance input as indicated at 162, the vehicle model 180 responds to a zero road disturbance input at 183 and to a modeled control command from the controller 182 via conductor 184. The controller 182 includes fixed gain feedback paths 187 and 188 which have nominal gain values chosen to provide an appropriate dynamic response under predetermined nominal conditions. The actual vehicle acceleration value a is applied to a summing node 190 in the fixed gain controller 182, along with the two feedback signals, such that the desired sensitivities (the partial derivative of the system variables with respect to the gain value $K_a$) are obtained as shown.

A similar arrangement seen at the bottom of FIG. 7 uses a second vehicle model 205 and a second fixed gain controller 210 to generate the quantities $\delta a/\delta K_p$, $\delta e/\delta K_p$ and $\delta u/\delta K_p$ on leads 221, 222 and 223 respectively, the only difference being that the summing node within the fixed gain controller 210 receives the position error value $\underline{e}$ rather than the body acceleration value $\underline{a}$.

Figure 8A:
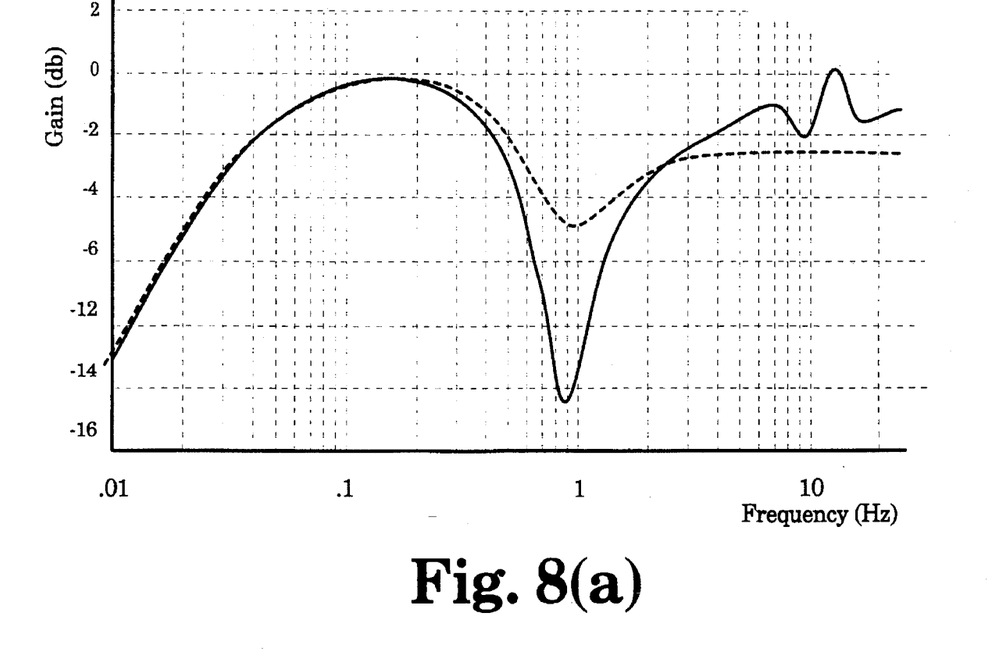
FIGS. 8(a) and 8(b) are graphs which depict typical gain and phase-shift characteristics of the sensitivity filters used to implement the invention.
Figure 8B:
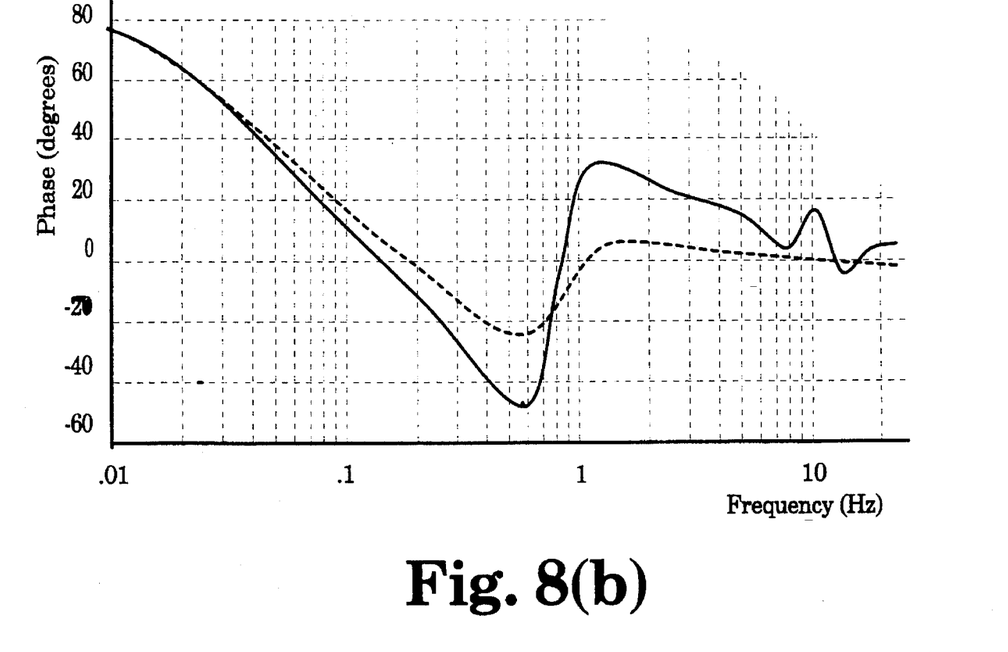

Besides a standard persistency of excitation requirement, the Bode phase characteristics of the pseudosensitivities must be within 90° of the actual sensitivities in the frequency range of interest. FIG. 8 shows the frequency response for one of the pseudosensitivity filters ($\delta u/\delta K_a$ seen as the dotted line curve) as well as the response of the corresponding exact sensitivity filter for an active suspension model. As seen in FIG. 8, the phase of the pseudosensitivity value is within 90° of the actual value over the complete range of frequencies. The adaptive routine has been shown to be stable and to adaptively converge the values of the feedback gains toward values which minimize the predetermined cost function as desired.

It is to be understood that the foregoing description of a preferred embodiment of the invention is merely illustrative. Numerous modifications may be made to the arrangement shown without departing from the true spirit and scope of the invention.

What is claimed is:

1. In combination with a controller for delivering a control signal to an external system, said control signal having a value related to plural, time-varying input signals each indicative of a variable quantity having a value characterizing said external system, said input signals being combined to produce said control signal in a manner specified by plural control gain values, apparatus for adaptively varying said control gain values comprising, in combination, means for averaging said plural input signals to produce a plurality of corresponding time-averaged signals, means responsive to said time-averaged signals for producing plural sensitivity signals each having a sensitivity value indicative of a predicted rate of change of the value of one of said input signals with respect to an incremental change in one of said control gain values, means for storing a set of weighting factors, each of said weighting factors being associated with a corresponding one of said sensitivity values, means for adaptively varying each given one of said control gain values by an incremental amount formed by combining the products of each given one of said sensitivity values multiplied by the corresponding one of said weighting factors, and means for adaptively varying said weighting factors in response to changes in said plural sensitivity signals.

2. The combination set forth in claim 1 further including means responsive to changes in the values of said input signals for establishing an adaptation rate, and means for adaptively altering said control gains at said adaptation rate, and means for decreasing said adaptation rate in response to high input signal values to insure system stability.

3. An adaptive suspension system for supporting a wheel with respect to a vehicle body, said system comprising, in combination, an actuator for applying a force between said body and said wheel in response to a control command, sensing means for generating a first sensed value indicative of the instantaneous vertical acceleration being experienced by said body as said vehicle moves over a road surface, sensing means for generating a second sensed value indicative of the vertical position of said wheel with respect to said body, closed-loop feedback means for generating said control command in response to said first and said second sensed values in accordance with a functional relationship determined by at least a first tunable feedback gain value, and means for adaptively varying said first tunable gain value comprising, in combination, means responsive to at least said first sensed value for generating an acceleration sensitivity value indicative of a rate of change of said instantaneous vertical acceleration with respect to an incremental change in said first tunable gain value, means responsive to at least said second sensed value for generating a position sensitivity value indicative of the rate of change of wheel position with respect to an incremental change in said first tunable gain value, means for repeatedly adjusting said first tunable gain value by an incremental amount having a magnitude related to a weighted sum of said acceleration sensitivity value and said position sensitivity value in accordance with a modifiable weighting relationship, and means, responsive to said first and second sensed values, for modifying said weighting relationship.

\* \* \* \* \*